(12) United States Patent
Reumerman et al.

(10) Patent No.: US 8,116,295 B2
(45) Date of Patent: Feb. 14, 2012

(54) DISTRIBUTED MEDIUM ACCESS PROTOCOL FOR WIRELESS MESH NETWORKS

(75) Inventors: Hans-Juergen Reumerman, Eindhoven (NL); Guido Roland Hiertz, Aachen (DE); Gustaf Sebastian Max, Cologne (DE); Ynpeng Zang, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 377 days.

(21) Appl. No.: 11/914,155

(22) PCT Filed: May 12, 2006

(86) PCT No.: PCT/IB2006/051505
§ 371 (c)(1),
(2), (4) Date: May 14, 2009

(87) PCT Pub. No.: WO2006/120651
PCT Pub. Date: Nov. 16, 2006

(65) Prior Publication Data
US 2009/0279487 A1   Nov. 12, 2009

Related U.S. Application Data

(60) Provisional application No. 60/680,996, filed on May 12, 2005, provisional application No. 60/753,852, filed on Dec. 23, 2005.

(51) Int. Cl.
*H04J 3/16* (2006.01)
*H04W 72/00* (2009.01)

(52) U.S. Cl. ...................................... 370/348; 455/450

(58) Field of Classification Search .................. None
See application file for complete search history.

(56) References Cited

U.S. PATENT DOCUMENTS

| 2003/0123405 | A1* | 7/2003 | del Prado et al. | 370/331 |
|---|---|---|---|---|
| 2004/0152416 | A1* | 8/2004 | Dahl | 455/41.2 |
| 2005/0063419 | A1* | 3/2005 | Schrader et al. | 370/466 |
| 2005/0249173 | A1* | 11/2005 | Salokannel et al. | 370/338 |
| 2006/0009229 | A1* | 1/2006 | Yuan et al. | 455/452.1 |
| 2006/0062181 | A1* | 3/2006 | Chou | 370/329 |
| 2007/0019666 | A1* | 1/2007 | Hirano et al. | 370/458 |
| 2008/0013515 | A1* | 1/2008 | Benveniste | 370/338 |

FOREIGN PATENT DOCUMENTS

| WO | WO 2004088878 | * 10/2004 |
|---|---|---|
| WO | 2005039105 | 4/2005 |

OTHER PUBLICATIONS

Hiertz et al "Mesh Networks Alliance (MNA) Proposal IEEE 802. 115—MAC Sublayer Functional Description IEEE 802.11S—Mesh WLAN Security" Internet Citation May 2005 URL:HTP://WWW. IEEE802.OG/11/DOCFILES/05/11-05-0605-02-000S-MESH-NETWORKS-ALLIANCE-PROPOSAL.DOC.

* cited by examiner

*Primary Examiner* — Robert Scheibel
*Assistant Examiner* — Eunsook Choi

(57) ABSTRACT

This invention defines a medium access protocol for the support of mesh networking in wireless communications. It defines a phase for intra-cell and a phase for inter-cell traffic. During the inter-cell traffic a beacon phase is used for the reservation of transmissions. In this phase also information about the mesh topology is included and parallel transmission are supported. Even though this medium access protocol is intended to be proposed in standardization of IEEE 802.11 mesh networks (802.11) it could be used in any wireless mesh network.

20 Claims, 7 Drawing Sheets

DISTRIBUTED MEDIUM ACCESS PROTOCOL FOR WIRELESS MESH NETWORKS

CROSS REFERENCE TO RELATED APPLICATION

This application claims the benefit of U.S. provisional application Ser. No. 60/680,996 filed May 12, 2005 and U.S. provisional application Ser. No. 60/753,852 filed Dec. 23, 2005, which are incorporated herein by reference.

MBOA (MultiBand OFDM Alliance) is a distributed system for WPAN (Wireless Personal Area Networks) running on an Ultrawide band (UWB) frequency band. Through DRP (Distributed Reservation Protocol), which makes channel resource reservations for future traffic, the MBOA system provides much higher channel access efficiency in a single hop communication scenario than other contention based protocols do, e.g., Prioritized Channel Access (PCA).

A mesh network is a PAN (Personal Area Network) that employs one of two connection arrangements, full mesh topology or partial mesh topology. In the full mesh topology, each node is connected directly to each of the others. In the partial mesh topology, some nodes are connected to all the others, but some of the nodes are connected only to those other nodes with which they exchange the most data. Mesh networks have the capability to provide a geographic extension of network coverage without increasing transmit power or receive sensitivity. Mesh networks also provide enhanced reliability via route redundancy, easier network configuration, and may increase device battery life due to the potential for fewer retransmissions of data.

Wireless mesh networks are multihop systems in which devices assist each other in transmitting packets through their network, especially in adverse conditions. One can establish a mesh network in a location with minimal preparation. Such mesh networks are also revered to as ad hoc networks. Mesh networks provide a reliable, flexible system that can be easily extended to thousands of devices.

The wireless mesh network topology, which was originally developed at MIT for industrial control and sensing, is a point-to-point-to-point, or peer-to-peer, system called an ad hoc, multihop network. A node such a network can send and receive messages. Furthermore, a node in a mesh network also may function as a router that can relay messages for its neighboring nodes. Through the relaying process, a packet of wireless data will find its way to its destination, passing through intermediate nodes with reliable communication links. In a wireless mesh network, multiple nodes cooperate to relay a message to its destination. The mesh topology enhances the overall reliability of the network, which is particularly important when operating in harsh industrial environments.

Referring to FIG. 1, through the relaying process, a packet of wireless data finds its way to its destination by passing through intermediate nodes with reliable communication links. In a wireless mesh network 10, multiple nodes, 12, 14, 16, cooperate to relay a message from an origin node 18 to its destination node 20. The mesh topology 10 enhances the overall reliability of the network, which is particularly important and useful when operating in harsh industrial environments.

Like the Internet and other peer-to-peer router-based networks, a mesh network 10 offers multiple redundant communications paths throughout the network. If one link between nodes fails (e.g. between node 14 and 16) for any reason (including the introduction of strong RF interference), the network automatically routes messages through alternate paths (e.g. from node 14 to node 22 and then to node 20).

In a mesh network, shortening the distance between nodes will dramatically increases the link quality. If the distance between nodes is reduced by a factor of two, the resulting signal is at least four times more powerful at the receiver. This makes links more reliable without having to increase transmitter power in individual nodes. In a mesh network, you can extend the reach, add redundancy, and improve the general reliability of the network simply by adding more nodes to the network.

Ultra wideband (UWB) is a wireless technology for transmitting large amounts of digital data over a wide spectrum of frequency bands with very low power for a short distance. Ultra wideband radio can carry a huge amount of data over a distance up to 230 feet at very low power (less than 0.5 milliwatts) and has the ability to carry signals through doors and other obstacles that tend to reflect signals at more limited bandwidths operating at a higher power. Ultra wideband is comparable with another short-distance wireless technology, such as Bluetooth, which is a standard for connecting handheld wireless devices with other similar devices and/or to, for example, desktop computers.

Ultra wideband broadcasts digital pulses, which are timed very precisely, on a carrier signal across a very wide spectrum (on a plurality of frequency channels) at the same time. The wideband transmitter and receiver must be coordinated to send and receive pulses with a high accuracy of within trillionths of a second. On any given frequency band used in an ultra wideband system, an ultra wideband signal requires less power than a normal signal on the band. Furthermore, the anticipated background noise of an ultra wideband signal is so low that theoretically no interference is possible.

Ultra wideband is being used in various situations, to date two prevalent applications of UWB include applications involving radar, in which the signal penetrates nearby surfaces, but reflects surfaces that are farther away, allowing objects to be detected behind walls or other coverings, and voice and data transmission using digital pulses, allowing a very low powered and relatively low cost signal to carry information at very high rates within a restricted range.

This invention defines a medium access protocol for the support of mesh networking in wireless communications. It defines a phase for intra-cell and a phase for inter-cell traffic. During the inter-cell traffic a beacon phase is used for the reservation of transmissions. In this phase also information about the mesh topology is included and parallel transmissions are supported.

Even though this medium access protocol is intended to be proposed in standardization of IEEE 802.11 mesh networks (802.11) it could be used in any wireless mesh network.

The above summary of the invention is not intended to represent each embodiment or every aspect of the present invention.

A more complete understanding of the method and apparatus of the present invention may be obtained by reference to the following Detailed Description when taken in conjunction with the accompanying Drawings wherein.

Figure 11A:
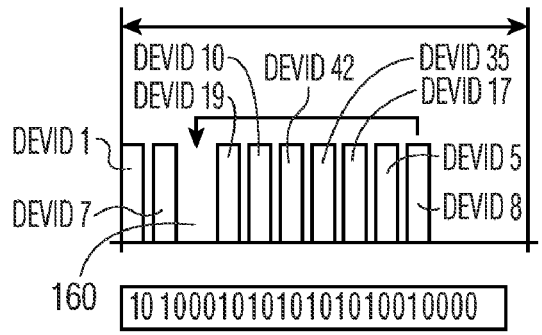
Figure 11B:
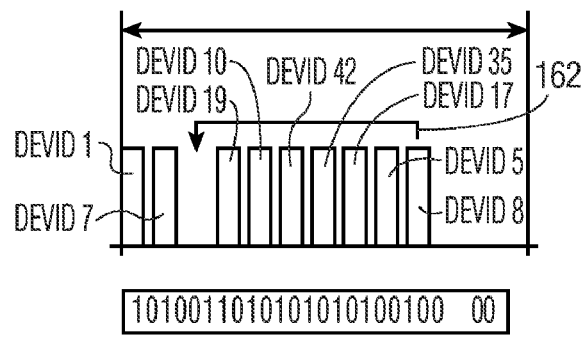
Figure 11C:
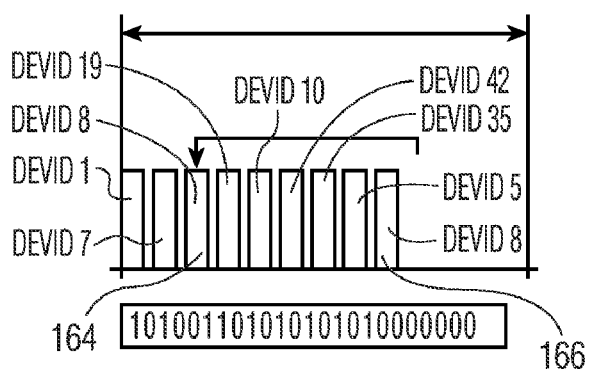
Figure 11D:
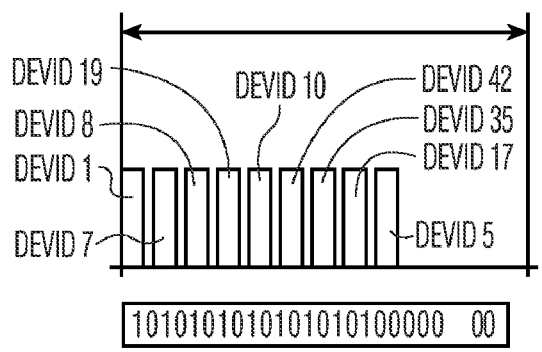
Figure 12:
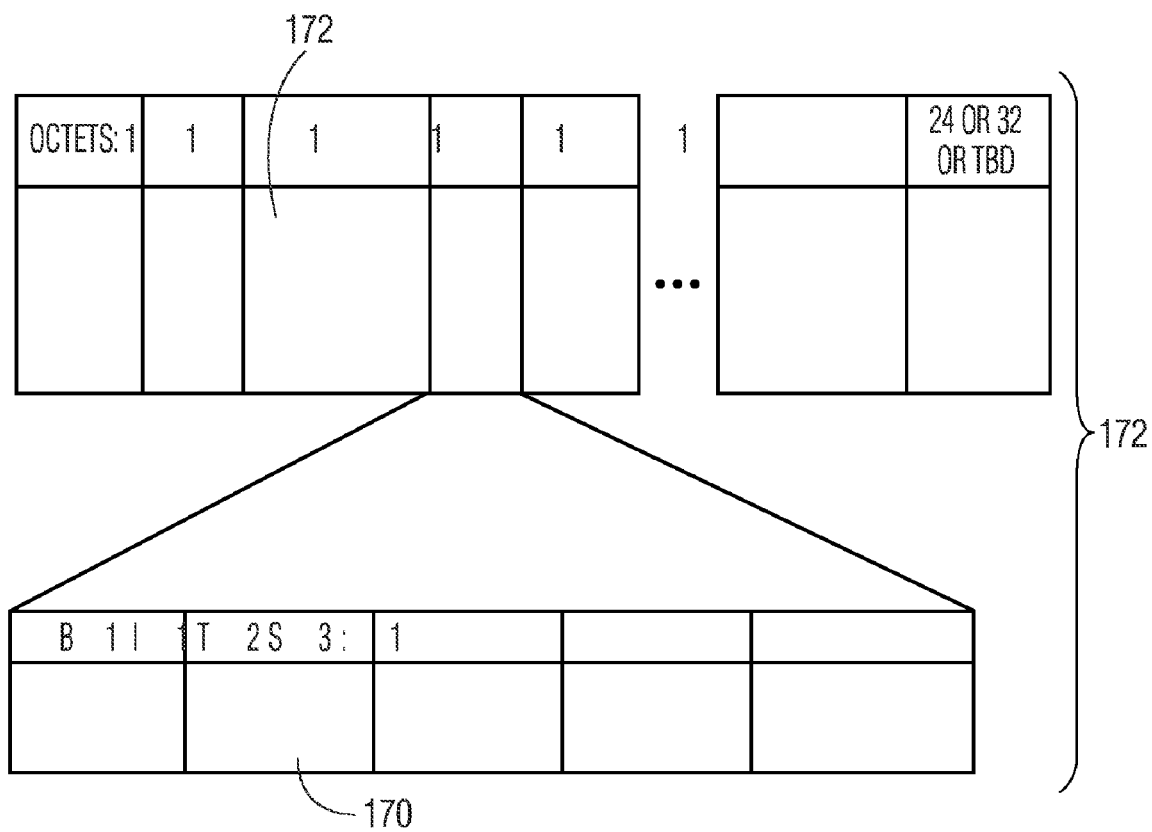

FIGS. 11a, b, c, and d depict an example of beacon shifting according to an embodiment of the present invention; and FIG. 12 depicts an exemplary structure of a TXOP Ownership IE.

Existing Medium Access protocols for Wireless LAN like IEEE 802.11 do not efficiently support multihop communication. Therefore, there is a need to find and to define procedures that allow for building an Extended Service Set (ESS) as a collection of Access Points (APs) interconnected with wireless links that enable automatic topology learning and dynamic path configuration. An ESS Mesh is functionally equivalent to a wired ESS, with respect to the stations' relationship with the Basic Service Set (BSS) and ESS.

Embodiments of the invention provide a Medium Access Control (MAC) protocol for a Wireless Distribution System (WDS) between a set of 802.11 Access Points (APs). Mobile stations operating in accordance with various embodiments and associated to any of the access points shall be able to communicate with: 1) Any access point in the given set; 2) Any mobile station associated to an access point in the set, and 3) Any connected external networks via a Mesh gateway.

The communication between the access points enabling the mentioned points shall be transparent to the mobile stations, in embodiments of the invention, especially regarding the location.

Access points in this exemplary wireless distribution service play a twofold role: On the one hand, the access points act as a basic 802.11 AP, providing special features to their associated stations. On the other hand, the access points are wireless stations themselves, communicating with each other to fulfill the services they have provided to their basic service set (BSS).

Figure 1:
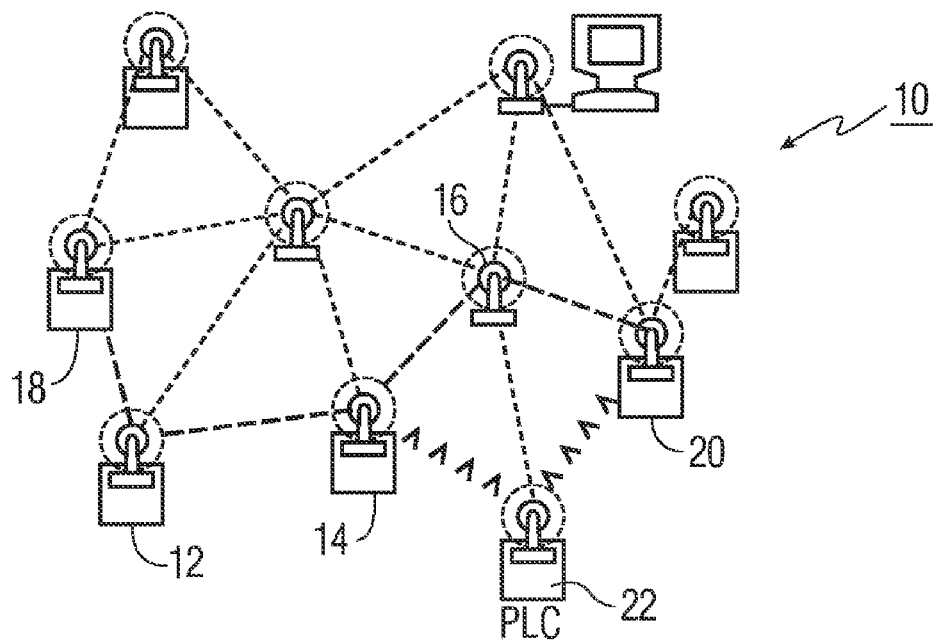
FIG. 1 is a is a mesh network.
Figure 2:
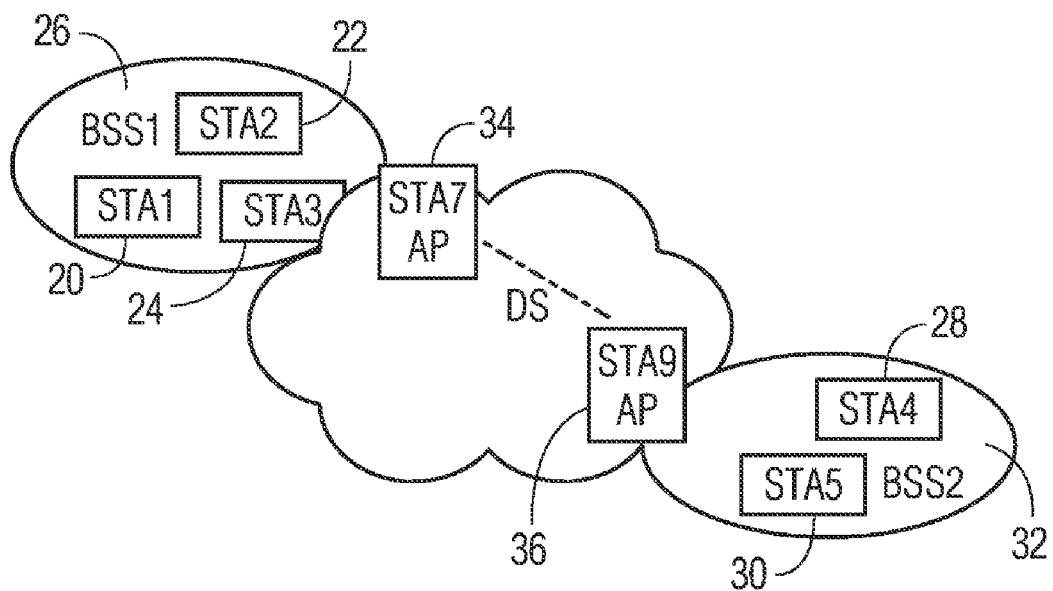
FIG. 2 is a diagram of an exemplary wireless scenario.

A typical scenario of an exemplary wireless scenario with two BSSs and one Distribution System (DS) is depicted in FIG. 2.

Stations one 20, two 22, and three 24 in BSS1 26 and stations four 28 and five 30 in BSS 32 constitute two, non-overlapping BSSs. The access point (AP) 34 in BSS1 26 and the access point 36 in BSS2 32 enable inter-BSS communication. The MAC-mechanism that supports this communication in a wireless distribution system (WDS) will be explained below.

The following assumptions may be made regarding the possible scenarios in accordance with embodiments of the invention:

1) Ad-Hoc placement of access points:

The spatial position of the access points is unknown to themselves and to the other access points; an access point may be placed arbitrarily in a given area. There is no previous knowledge regarding the structure of the environment, the distances between neighboring APs, and the interference situation; and furthermore there is no possibility to obtain geographical information about the APs or obstacles between them.

2) The access point topology is semi-stationary to stationary:

The speeds of any AP changes are negligible compared to the movements of associated stations and the traffic patterns.

3) The network of access points is not fully connected:

Due to indoor-conditions or large areas to be served, it cannot be assumed that the communication graph of the APs, describing the possibility of direct communication between APs, is fully connected. However, each pair of APs must be connected by a path of possibly several other APs, which means that the communication graph is connected.

One implication of this assumption is the impossibility of a simple broadcast in the DS, which complicates any attempt of a centralized coordination. Another one is the need of multi-hop-mechanism, allowing APs to relay data to other APs on so the data can continue on its way to a final destination.

Figure 3:
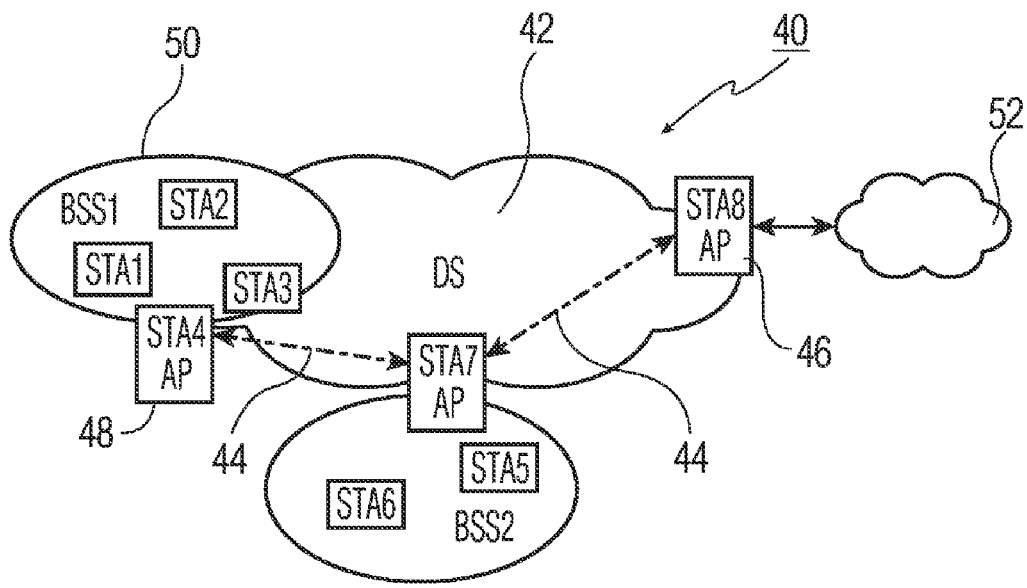
FIG. 3 is a diagram of an exemplary wireless multihop scenario.

An example scenario where multihop communication is needed can be seen in FIG. 3, which is a wireless multihop scenario 40. By transparent usage of the DS 42 and a multihop connection 44 between the AP 46 and AP 48, the stations in BSS1 50 are able to connect to Station 8 46, which acts as a gateway to the internet 52. Without a multihop-enabled DS 42, this would become impossible because Station 4 48 cannot wirelessly reach and communicate with Station 8 46.

Exemplary access points may posses only a single frequency radio. This requirement simplifies and decreases the cost of the construction of APs, but causes the complication that the DS and every BSS have to share the same wireless medium, resulting in possible conflicts and efficiency decreases. An easy exemplary improvement of the MAC-protocol can be archived using dual-frequency radios or even multi-frequency radios.

In embodiments of the invention discussed below, it should be understood that, a station is (1) a basic 802.11-access point, able to provide management services like association and creation of a BSS, and (2) is a station in a wireless distribution system, able to use multi-hop communication between its peers to obtain abilities needed for its access-point functions, and (3) is placed in a scenario as explained above that is defined to be a mesh-network station or Mesh Point.

In contrast to the EDCA, which is used in the AP traffic phase, this new exemplary MAC protocol allows an efficient multihop communication in the mesh network. The use of negotiated transmission opportunities (TxOPs) of equal length result in a predictable medium access, as all neighboring Mesh Points are able to learn which Mesh Point in the mesh network plays which part during a TxOP. This enhanced knowledge/information provided to the mesh points allows the protocol to allow a greater spatial reuse, which directly is followed by a capacity increase of an exemplary mesh network.

Figure 4:
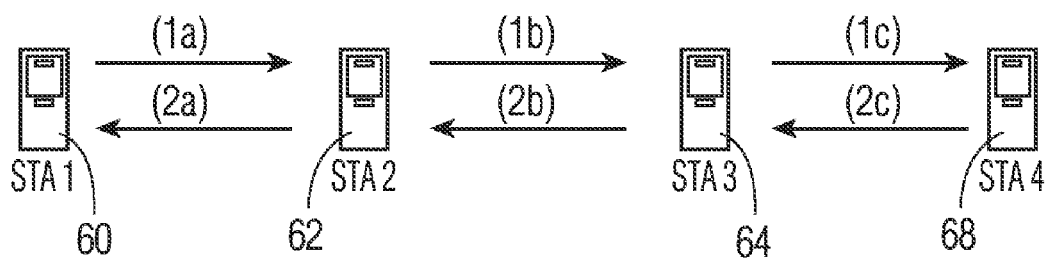
FIG. 4 is a simple wireless mesh network scenario where spatial reuse is possible.

A simple example for the possibilities of spatial reuse can be found in FIG. 4. Mesh Points STA1 60, STA2 62, STA3 64, and STA4 68 each have their own BSS and probably several associated mobile stations. The mobile stations in the BSS of Mesh Point STA1 60 generate traffic that is addressed to Mesh Point STA4 68 (STA4 68 is, for example, a gateway or portal to the internet), and Mesh Point STA4 68 replies to traffic.

As Mesh Point STA1 60 and STA4 68 are mutually out of reception range, they cannot communicate directly with each other. They must use two, three hop routes via Mesh Points STA2 62 and STA3 64, which are depicted as (1a-c) and (2a-c).

If Mesh Point STA3 64 is able to guess that simultaneous usage of link (1a) and (2c) is possible because the interference created by Mesh Point STA1 60 at Mesh Point STA3 64 during the transmission is low, then Mesh Point STA3 64 may negotiate with Mesh Point STA4 68 such that the number of used TxOP are to be the same as they are used for the link (1*a*). The latter information is directly available to Mesh Point STA3 64 via the negotiation procedure between Mesh Point STA1 60 and Mesh Point STA2 62.

Figure 5:
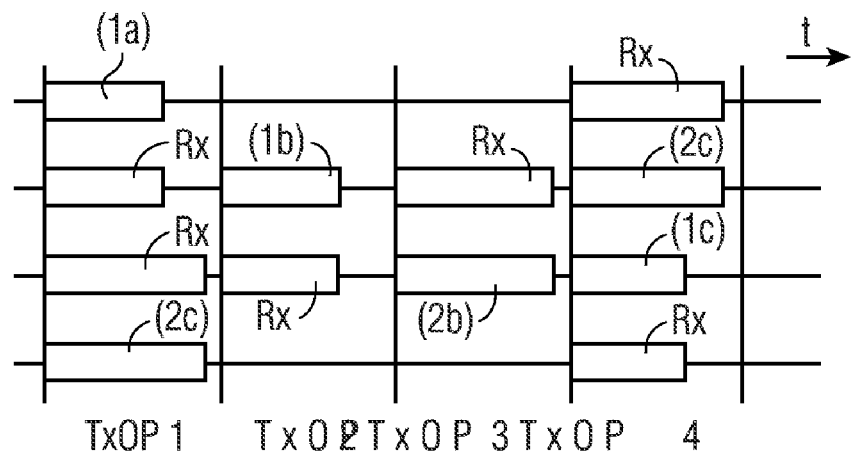
FIG. 5 is an exemplary traffic/time diagram for the scenario of FIG. 4.

Similarly, links (1*c*) and (2*a*) can be used simultaneously, which results in an exemplary traffic/time diagram as given in FIG. 5. FIG. 5 is an optimal alignment of the transmissions during time for the scenario in FIG. 4.

While embodiments of this invention support spatial reuse, the mechanism used by the Mesh Points to decide which TxOPs can be transmitted simultaneously is out of the scope of this invention.

Exemplary essential features of the present invention are the definition of a MAC protocol that supports parallel transmission by the means of TxOP reservation. It divides the time interval (superframe) in a first phase for intra-BSS traffic (AP traffic) and a second phase for intra-DS (Mesh traffic).

During the AP traffic phase, existing MAC mechanisms like DCF, EDCA, and HCCA are used for communication between the stations and the access point. The mesh traffic phase is protected from legacy 802.11 by the use of the contention free period (CFP). The mesh traffic phase is divided in a beacon period, which takes place every two superframes and another period for data transmission. Embodiments of this invention introduce enhancements for mesh topology such as an inclusion of neighbor's neighbor slot occupancy and support of parallel transmissions during the TxOP negotiation. Other mechanisms like the Ghost Beacon period, Buffer zone, variable beacon length, short address format, cumulative Acknowledgement can also be used to improve performance of the exemplary MAC protocol.

MAC Architecture

One of the main targets of an exemplary MAC layer in a Mesh Point is to provide access to the Distribution System (DS) with the aim of relaying data which originates from associated 802.11 stations or gateways (portals). Communication between different Mesh Points is either a MAC internal management communication or is the effect of a previous communication between a mobile 802.11 station and its Access Point.

Figure 6:
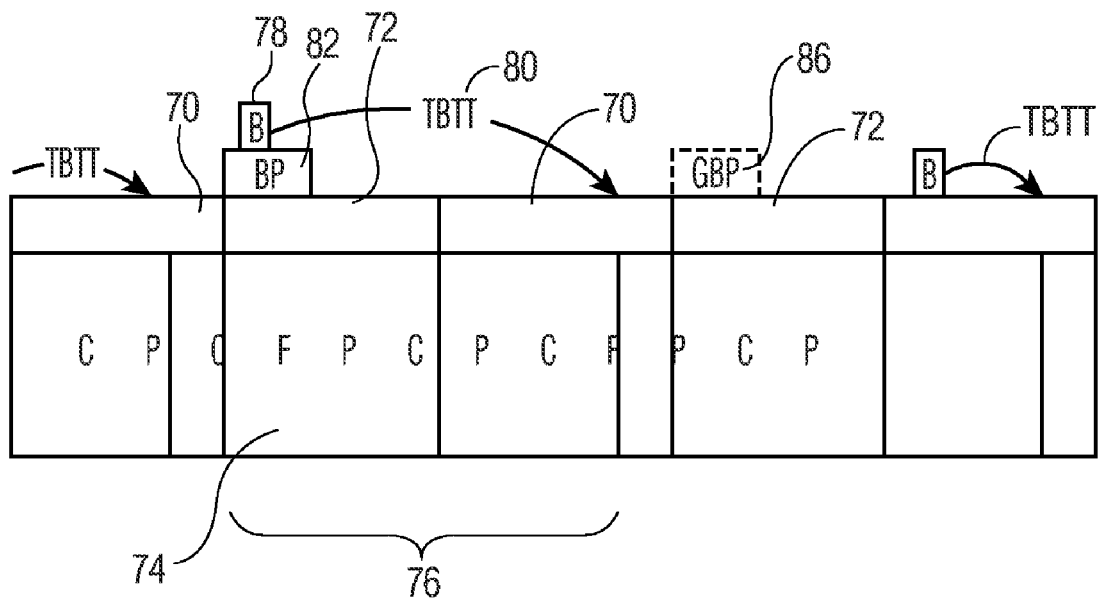
FIG. 6 depicts the exemplary alternation of AP-Traffic and Mesh-Traffic.

Referring to FIG. 6, an exemplary MAC protocol offers efficient support for single and multi radio Mesh networks. In a single radio Mesh network, division between intra BSS traffic and intra DS traffic is done over time: Phases for the exchange of data between a Mesh Point and its associated mobile stations alternate with phases intended for peer traffic between Mesh Points. Traffic in the first phase is called AP traffic 70, whereas traffic in the second one is called mesh traffic 72. With multi radio Mesh Points one or more frequencies for AP traffic and one or more frequencies for Mesh traffic may be used.

To allow for an efficient usage of the radio resource, a solution for a single radio/single frequency Mesh network is much more complicated than a multi radio solution. Exemplary embodiments proposed here, are able to support single and multi frequency solutions. First we will discuss a solution for single radio Mesh networks.

In the AP traffic phase (ATP) 70, the 802.11 DCF, 802.11e EDCA or 802.11e HCCA is used to access the wireless medium (WM) by Mesh Points and by stations. Thus, the ATP 70 is also compatible to non 802.11s stations. The mesh traffic phase (MTP) 72 uses the announcement of a CFP 74 to silence any non Mesh Points (legacy 802.11 stations). Therefore, the MTP is structured to support the goals of the intra DS traffic (i.e. 44), especially a good multihop performance. The mesh traffic phase 72 is explained below in the chapter "Mesh Traffic Phase" portion.

One MTP 72 and one ATP 70 together define the Superframe 76 known from 802.11 standards. A superframe 76 has a fixed length of mSuperframeSize. The fraction of this superframe 76 that is used for the MTP 72 must be in between mMTPMinTime and mMTPMaxTime. The duration of the ATP 70 is not restricted furthermore.

Silencing the 802.11-Stations

According to standard 802.11, each CFP 74 starts with the transmission of a beacon 78 by the AP at Target Beacon Transmission Time (TBTT) 80. Among other information, the beacon 78 announces the duration of the Contention Free Period (CFP) 74 in the Basic Service Set of the AP and the duration of the superframe 76. Thus, the start time of the next CFP is defined also. All 802.11 standards respect the CFP as period during which no transmission may be initiated by any other station than the AP (802.11e Hybrid Coordinator (HC) or 802.11 Point Coordinator (PC)). Having learned from previous beacons all 802.11 stations will refrain from accessing the channel until they are either polled (if they are CFPollable) or the CFP ends. Furthermore, all station calculate and know when the start point of the next CFP will occur, and will be silent even if no beacon was received at the beginning of the next superframe/CFP.

Figure 7:
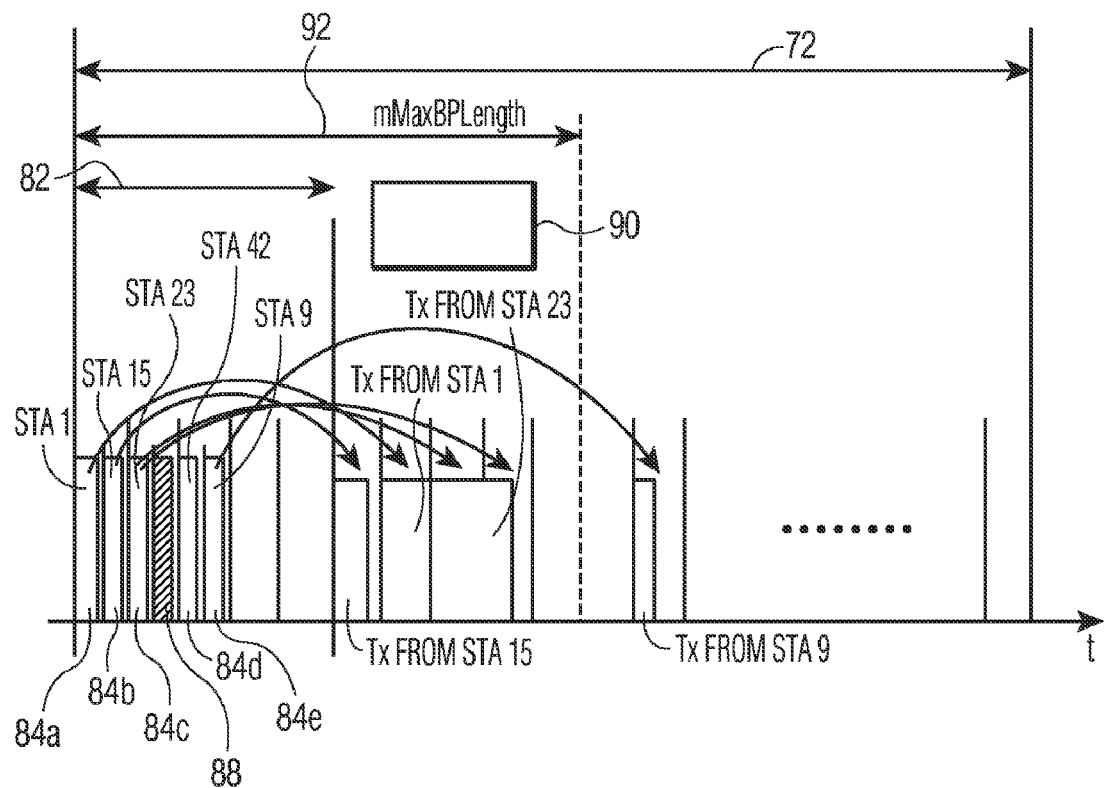
FIG. 7 is a exemplary structure of the mesh-traffic phase, including the BP and TxOP ownerships in accordance with the present invention.

Referring to both FIG. 6 and FIG. 7, since no station will access the wireless medium during the CFP 74 without being polled by the HC or PC, a Mesh Coordination Function (MCF), that is independent from legacy 802.11 contention, can be used during the CFP. Every MTP starts with a beacon period (BP) 82. During the BP 82 every Mesh Point sends a beacon frame 84*a*-84*e*. In each station's beacon frame, it announces the start of a CFP to its associated stations including the start time of the next CFP. As all stations will respect the latter CFP, no special announcement is needed. Therefore, to further enhance the exemplary protocol, the APs may optionally use every 2nd BP (which can be considered as protocol overhead) only. Thus one BP 82 is needed in two superframes only. The missing BP is indicated by the term "Ghost Beacon Period" (GBP) 86, in which the stations expect a beacon, but do not receive one.

It is important to notice that during the ATP 70 following the MTP 72 with the GBP 86, each AP has to send a beacon to announce the beginning of the upcoming MTP. FIG. 6 depicts the exemplary alternation AP-Traffic and Mesh-Traffic.

Using the CFP 74 as a means to allow a mesh specific protocol requires special care. For example, in non 802.11s, a situation called a "foreshortened" CFP can occur: Stations may start a transmission before the CFP, even if the transmission takes longer to finish than the rest of the CP (Contention Period). Therefore, the 802.11 AP may sense a busy medium at TBTT, which marks the start of the CFP, and refrain from sending its beacon until the transmission ends. This behavior shortens the CFP by the delay; therefore, providing the name of the situation "foreshortened".

A "foreshortened" MTP is not acceptable in an exemplary mesh network, since there might be stations that did not hear the "disobedient" mobile station 88 because of their distance. These stations will start the MTP as scheduled. Hence, the starting point becomes unsynchronized. To guarantee an idle medium at the beginning of the MTP, the TBTT is announced to be a small moment before the real start. This buffer zone has exactly the duration of a maximum sized packet send at the basic PHY mode, so that the "disobedient" station will stop sending before the MTP. APs may send traffic in the buffer zone, using the 802.11e EDCA to avoid collisions with other APs. Therefore, Channel time is not wasted, and the APs will take care of stopping the transmission at the start of the MTP.

Mesh Traffic Phase

In the MTP 72 all Mesh Points use the mesh coordination function (MCF) to share the medium. Two subsequent equal length phases, the first starting with a BP 82, the other one with a GBP 86, are connected with each other by the BP 82 in which the coordination of the remaining time is done. A proposal of their length is stated by each station in an IE in its beacon, any station may use the maximum of the proposed values. The proposal does not affect the current pair of MTPs, but the following one, as the silencing of the associated stations is done with the "old" value.

The MCF divides the two phases into several transmission opportunities (TxOPs, known from QoS supporting amendment 802.11e) 90 of mTxOPLength 92 and provides a protocol to acquire the ownership of one or several TxOPs 90. The negotiation of ownerships is performed by the including of information elements 84a-84e in the BP 82.

After a few BPs, the negotiation of a TxOP ownership 90 is finished, which results in an agreement between the new owner of the TxOP and the intended receivers. The agreement ensures that the receivers are listening for a transmission from the owner during the TxOP.

All other stations in the neighborhood of the owner and the receivers will respect the agreement and therefore will: (1) Refrain from being sender if that could disturb the owner's transmissions and (2) refrain from being receiver if the sender could disturb the owner's transmission.

An ownership of a TxOP guarantees therefore the best possible chance of a successful transmission during this time. The negotiation process, which is performed using the BPAP, is explained below in the section titled "

TxOP Negotiation". The time flow during one mesh traffic phase, from the viewpoint of one station is drafted in FIG. 7.

At the beginning of the traffic phase, each Mesh Point sends a beacon, in which it states the ownership of one or more of the following TxOPs, which have already been negotiated. After the BP, the owners may transmit in the appropriate TxOPs.

Once a Mesh Point is the owner of a TxOP, it may use the given time for sending data to the previously announced receivers. This data falls into one of the following categories:

1) Payload from the sender's BSS to another BSS

Relayed payload from a different BSS to another BSS

Positive or negative acknowledgement of previous data receptions

Information Elements addressed to the receiver only

To sum it up, the MTP falls into three building blocks: The beacon access protocol (section "Beacon Period Access Protocol"), the TxOP ownership negotiation (section "TxOP Ownerships") and finally the data transmission during the owned TxOP.

Device IDs

The expected number of Mesh Points in a typical scenario, for example in a campus environment, is typically less than or equal to 32. Therefore, a six octet field (like it is used in 802.11) for addressing traffic between Mesh Points is not needed. As long as it can be ensured that every Mesh Point in the mesh network has its own unique identifier, a shorter identifier may be used. The source and the destination of a data packet in the network are still addressed using the common address. However, any intermediate Mesh Point uses a mDevIdBits bit Device Id (DEVID) as the transmitter and the receiver address during the MTP.

Before selecting a random Device ID, a new Mesh Point listens to the current traffic and collects all IDs from the beacon period access protocol, so that conflicts with stations in the neighborhood and also with stations in the neighborhood's neighborhood are avoided.

Beacon Period Access Protocol

Every 2nd MTP 72 starts with a beacon period 82. It is used to silent non-Mesh Points (non 802.11s stations) by starting a CFP 74. Further it is used to organize the traffic in the rest of the MTP and in the next MTP, which starts with a GBP.

Figure 8:
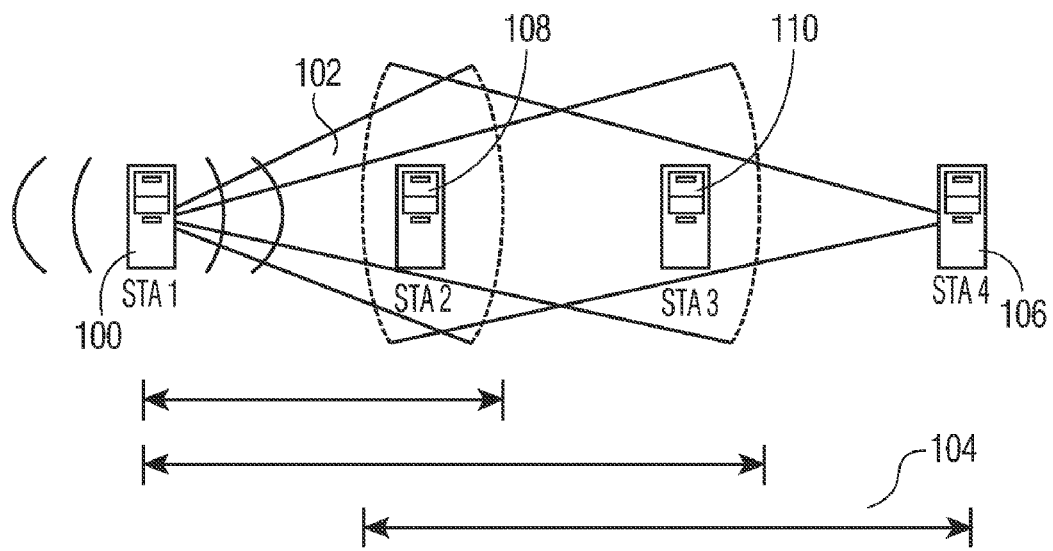
FIG. 8 shows that while Station 1 sends a beacon, the beacon period access protocol has to avoid interference by station 4.
Figure 9:
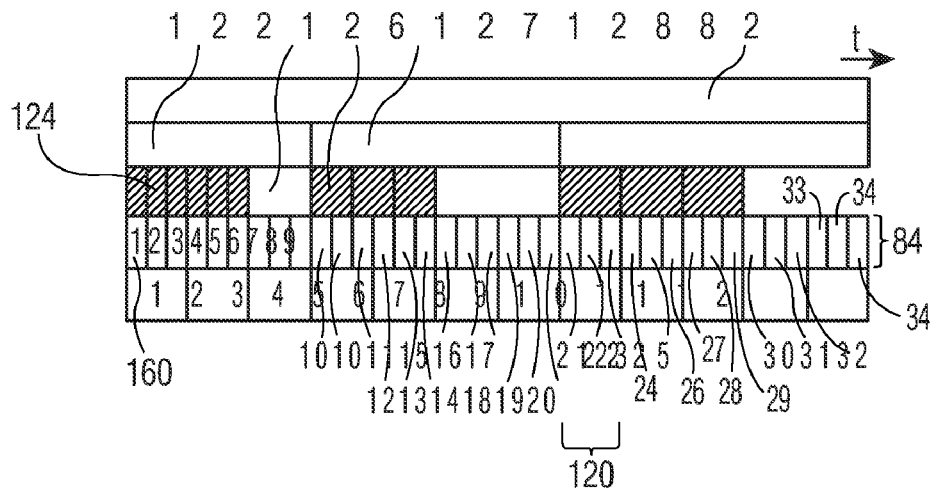
FIG. 9 shows an exemplary detailed structure of a beacon period with three zones.

Referring to FIG. 9, the Mesh Coordination Function shares the wireless medium between the Mesh Points. It is organized as follows. During the BP the beacon period access protocol (BPAP) is used. The BP is segmented into small slots 84. In the beacon period 82 shown in FIG. 9 there are 34 slots 84. The status of each slot is disseminated in the near neighborhood. This is done to lower the probability of a collision of two beacons from different Mesh Points in the same time slot. The dissemination is done over a three hop distance. The reason for this is explained using FIG. 8. FIG. 8 shows that while Station1 100 sends a beacon 102, the beacon period access protocol has to avoid interference 104 by station4 106.

Here, the situation on the wireless medium is shown during a beacon slot which is occupied by Mesh Point STA1 100. All stations (802.11s Mesh Points and non 802.11s stations) in the transmission range of a Mesh Point must correctly receive the beacon frame of Mesh Point. A beacon collision may occur at a receiving station if a Mesh Point (like station4 106) would transmit a beacon in the same time interval. To prevent beacon collisions, the beacon period occupancy information element (BPOIE) in every beacon informs neighboring Mesh Points about when a beacon will be sent or received. The BPOIE has four possible entries per beacon slot (e.g. 84a). The four possible means are:

The beacon slot is occupied by the sending Mesh Point.

The Mesh Point knows about a blocked Beacon Slot. It must listen to a neighbor which occupies this beacon slot.

The Mesh Point will receive interference during this beacon slot and therefore cannot guarantee reception in this slot.

From the point of view of the Mesh Point the beacon slot is free.

In the scenario in FIG. 8, Mesh Point STA1 100 sets the beacon information to beacon slot type 1. Mesh Point STA2 108 sets the beacon information beacon slot to type 2, and so on. Mesh Point STA2 108 propagates this information in its beacons. As Mesh Point STA4 106 receives the interference information about this slot from Mesh Point STA3 110, it knows that it shall not send in this slot, because:

the Mesh Point STA3 110 might not be able to receive the beacon successfully, and/or the beacon may collide with another beacon.

This exemplary method of collision avoidance is called virtual clear channel assessment (V-CCA). Additionally, the stations can also use the traditional physical clear channel assessment (P-CCA), which is done by sensing the strength of transmissions occurring in a beacon slot in one BP and then marking the slot as used if the threshold of mBPNoiseThreshold is exceeded.

In the following paragraphs, a detailed exemplary implementation of a BPAP is explained, including the beacon structure, the process of joining and leaving the BP, the detection of collisions, and the contraction of the BP.

Beacon Period Timing Structure

Referring to FIGS. 6 and 9, during the BP 82, time is slotted into intervals of mBPSlotLength length. Any transmission of a beacon has to start at the beginning of an interval. mBPSlotsPerTxOP subsequent intervals have the same size of a TxOP 120. The duration of the BP 82 must be a multiple of a TxOP 120. FIG. 9 shows the detailed structure of a beacon period with three zones.

As one beacon can occupy several subsequent beacon slots 84, beacons of the same size are ordered in their dedicated zone. In zone number "i" 122, only beacons of the length "i" 124 times mBPSlotLength are allowed. Zone "i" 122 ends with the end of a TxOP, furthermore there have to be "i"*mFreeSlotsInZone at the end of each zone. This allows new Mesh Points to join the BP 82 by sending a beacon in these free slots 126. The owner of the first beacon 127 in the subsequent zone 128 is responsible for freeing his slot if the number of free slots in the previous zone falls below this number. If the number of free slots 126 in the last zone 122 is below the minimum, the beacon period grows by the required number.

If a Mesh Point is to send a beacon in a zone that does not exist, the Mesh Point sends a beacon in the next smaller zone and indicates the creation of the new zone in its BPOIE.

A possible exemplary beacon period is shown in FIG. 9. In the configuration chosen there are three slots per TxOP 120 and mFreeSlotsInZone is equal to 2.

The maximum length of the beacon period 82 is limited to mMaxBPLength 92 TxOPs, but may be considerably shorter. The maximum length of the beacon period may even differ in separated areas of a mesh network.

Any Mesh Point that is to transmit or receive data in the upcoming traffic phase has to send at least one beacon in the beginning of an unoccupied beacon slot and listen to the neighboring beacons.

It is possible for a Mesh Point to send more than one beacon in the BP as long as different information is transmitted in each beacon. It is recommended that a Mesh Point tries to send its information in a single beacon of appropriate size in the proper zone, creating a new zone if needed. Each transmission has to end with a guard time of at least mTimeBetweenBeacons before the next beacon slot starts.

Alternative Beacon Timing Structure

The exemplary BP Structure of FIG. 9 can be simplified by not incorporating the usage of different zones for different length beacons, but this may inevitably complicate the BP Contraction.

In Another exemplary embodiment and alternative proposal for a BP 82, an arbitrary alignment of the beacons during the BP can be used. If a Mesh Point stops sending beacons, a gap of one or several continuous slots is created. The gap that is created should be filled by existing beacons either by sliding (if the beacon is situated directly after the gap) or by jumping. To be efficient, large jumps shall be preferred over several consecutive small jumps. This can be done by a last-come-first-served strategy during processing of the intentions to change to the beacon slot. For example, the Mesh Point that sends the last beacon in the BP in which the beacon announces the new ownership of the free slots will get the slots.

Beacon Contents

An exemplary beacon 78 carries two important pieces of information. On the one hand, a beacon transports information elements that are used to coordinate the beacon phase access protocol and the traffic phase. On the other hand, associated 802.11 stations must be capable of understanding the beacon structure so they can identify the start of a CFP 74.

Figure 10:
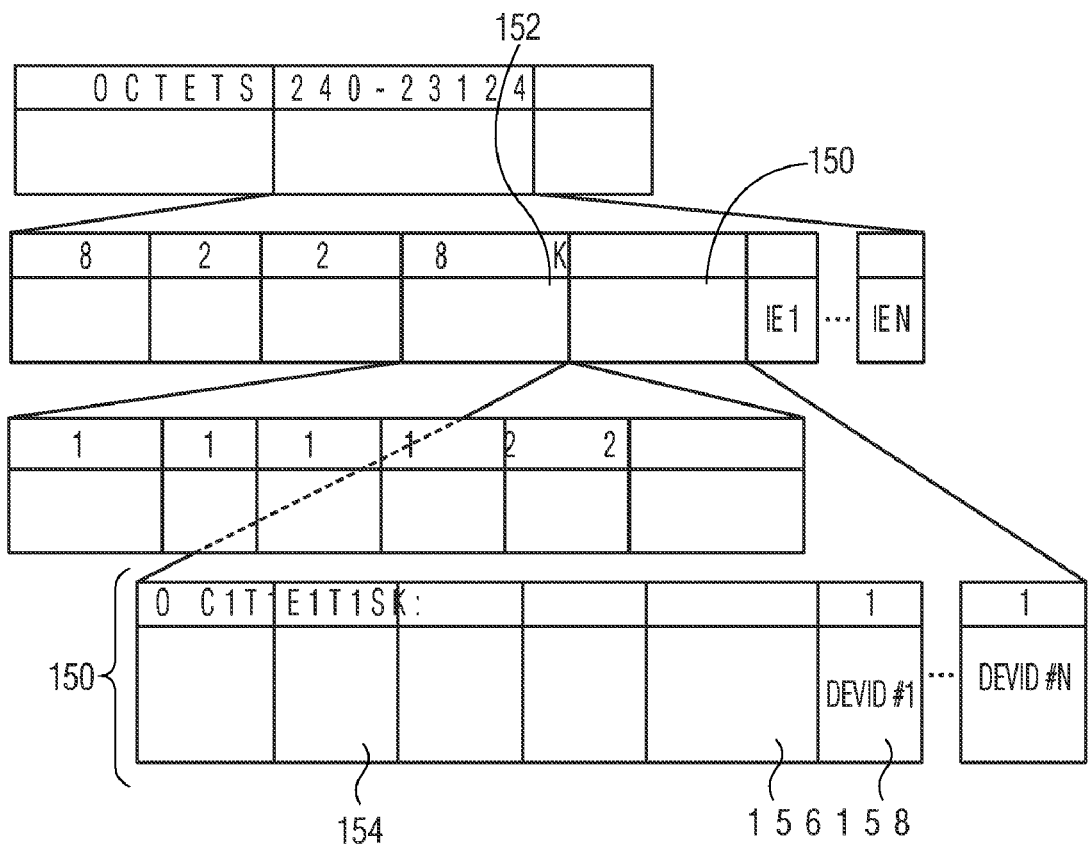
FIG. 10 shows a standard 802.11 beacon with an exemplary CF Parameter set and a BPOIE.

To supply the latter of the two functionalities, the beacon structure must comply with the structure defined in the IEEE Wireless LAN Edition, 7.2.3 Management frames ff (herein incorporated by reference), which is repeated shortly in FIG. 10. FIG. 10 shows the standard 802.11 beacon with an exemplary CF Parameter set 152 and a BPOIE 150.

As every beacon 78 sent by a Mesh Point starts a CFP 74, it has to include a CF-Parameter set 152, which silences the associated stations for the current and the next MTP 72, which starts with a GBP 86.

The beacon period occupancy IE (BPOIE) 150 is responsible for the beacon period access protocol and the dissemination of the BP slot status in the mesh network. The entries in the BPOIE are explained in the following paragraphs.

BP Length

The BPLength field 154 is used to indicate a Mesh Point's view of the current length of the BP 82, which is the number of TxOPs 120 that the Mesh Point will listen to for beacons before starting to transmit or receive data in the MTP 72. As it is important to synchronize the BP Length in the neighborhood, it is calculated as the maximum of:

the last heard traffic in the last BP, the last occupied slot as reported from the received beacons in this BP, and/or the last occupied slot as reported from the received beacons in the last BP plus the appropriate number of free slots which can be calculated recognizing the number of zones (by the extension slots of each zone) in the last BP. The BP Length shall never grow larger than mMaxBPLength 92.

BP Bitmap

In a beacon send of an exemplary embodiment, a device announces its view of the occupancy of the BP 82, which is done by sending a BP Bitmap 156 of the size 2*mBeaconSlotsPerTxOP*BPLength bits. If the end of the BP Bitmap 156 does not fall together with an end of an octet, the BP Bitmap 156 is filled up with zeros which are not interpreted by any Mesh Point. The information inside the BP Bitmap 156 shall be as fresh as possible, e.g. incorporating information of the BP Bitmaps of beacons that have been just received.

Each bit double inside the BP Bitmap corresponds to exactly one beacon slot. The bits inside the double express the occupancy of this slot as seen by the sending Mesh Point. The four possible combinations and their meaning are given in Table 1.

TABLE 1

The four possible beacon slot states, as indicated in an exemplary BP Bitmap

| Element value (b1b0) | Beacon slot interpretation |
|---|---|
| 00 | Free slot<br>The currently transmitting Mesh Point can receive beacons here. |
| 01 | Occupied by sending Mesh Point<br>This slot is occupied by the currently transmitting Mesh Point and this Mesh Point has sent/is sending/will send a beacon in this slot. |
| 10 | Occupied by neighboring Mesh Point<br>This slot is occupied by a neighboring Mesh Point, and the Mesh Point currently transmitting has successfully received a beacon in this slot or expects to receive one if it refers to a slot in the future. |
| 11 | Occupied by neighbor's neighbor Mesh Point<br>This slot is occupied by a Mesh Point which is a neighbor's neighbor but not a direct neighbor or out of the receiving range but still creates noise. The Mesh Point expects that a beacon send to it will not be decoded successfully because of the existent interference. |

The BP Bitmap is built up internally during the BP 82, incorporating new information while beacons are received. In each transmitted beacon the freshest BP Bitmap is sent.

Owner Vector

In any beacon send, which has a BP Bitmap with entries set to 10 or 11, an owner vector must be sent after the BP Bitmap. The owner vector consists of mDEVIDBits bits 158 for each entry set to 10 or 11 in the BP Bitmap, and indicates the DEVID of the appropriate Mesh Point. If the DEVID is unknown to the sending Mesh Point (which may happen only if the entry is set to 11), the DEVID is set to zero.

Q Beacon Transmission and Reception

After a Mesh Point is powered up, the Mesh Point device scans for beacons in mScanBeacons subsequent BPs. If the Mesh Point device receives no valid beacons after the scan, then before it transmits or receives any frames, it creates a new BP 82 by sending a beacon 78 in the first beacon slot 160 in the BP 82.

If the 'just powered-up' Mesh Point device received one or more valid beacons during the scan, it does not create a new BP 82. Instead it builds up an internal occupancy map (IOM) that is updated with every beacon received. The internal occupancy map is a bitmap consisting of mMaxBPLength bits 92. Each bit corresponds to a beacon slot 84 in the BP 82. A bit is set to one if and only if the Mesh Point:

is the owner of this slot, which requires that it has send a beacon in this slot before, or has received a beacon in this slot, or has received a beacon with a 01, a 10 or an 11 in the corresponding entry in the BP Bitmap.

Otherwise, the bit is set to zero.

Using the occupancy map (and the information about the zones that can be computed from the received beacons), an exemplary Mesh Point sends a beacon in the first slot(s) 160 marked zero in the zone that corresponds to the length of the beacon to be send. If the appropriate zone does not exist, the Mesh Point creates a new zone by sending a beacon in the last free beacon slot.

If a device detects a beacon collision as described in the next section, it shall randomly choose another slot which is marked zero in its IOM.

Beacon Collision Detection and Resolving

Let the Mesh Point with the DEVID "x" send a beacon in the beacon slot "j" in the BP "n". The station shall consider the beacon to be transmitted successfully if and only if in all beacons received by neighboring Mesh Points in the following BP entry "j" in the BP Bitmap is set to "10" and the corresponding entry in the Owner Vector is "x", or the entry "j" is set to "00".

If the beacon cannot be considered successful, the Mesh Point is involved in a beacon collision and shall choose randomly another free slot using its IOM.

BP Leaving

If a Mesh Point wants to free one of its beacon slots because the amount of its beacon information has been reduced, the Mesh Point frees-up its last beacon slot in the BP 82. The Mesh Point shall furthermore announce its departure by sending a last beacon in the slot where this slot is marked as 00 in the BP Bitmap 156.

BP Contraction

If a Mesh Point is, according to its IOM, the last beacon holder of a zone and there are slots in the same zone that are marked as free, the Mesh Point shall shift its beacon to the free slots by the following procedure. If "j" is the number of the free beacon slots, The Mesh Point shall:

transmit a beacon in the original slot with slot "j" set to "01" in the BP Bitmap, transmit a beacon in slot "j" in the next BP, and/or transmit a departure beacon as described in "BP Leaving" (above) the original slot.

FIG. 11 shows an example of beacon shifting according to an embodiment of the present invention. First the slot "3" 160 is sensed free by a Mesh Point with DEVID "8", furthermore the Mesh Point with DEVID "8" knows that it is the Mesh Point sending the last beacon in the BP 82. Therefore it tries to occupy slot "3" 160 by reserving the slot 162 in FIG. 11*b*. In the next BP, it can send its beacon 164 in slot "3" 160 and announce its departure in slot "10" 166. Finally, in FIG. 11*d* the shift is completed successfully.

It is possible that the extension zone and therefore the beginning of the next zone or the traffic phase shifts after a shifting of one or more beacons. FIG. 11 shows the four steps of a BP Contraction. The last device of Beacon zone shall move its beacon position to the very first empty slot of the Beacon zone. This is the four step procedure. First the Mesh Point that intends to move its beacon to the unoccupied, empty slot shall transmit a beacon in its original slot with an announcement that it intends to move its beacon to the empty slot announced in the beacon (set to "01" in the BP Bitmap). Then, during the next BP a beacon in both slots—the new 164 and the old one 166—is transmitted by the Mesh Point. And finally, the Mesh Point Device stops transmission of a beacon frame in the last slot 166. Hence, the Beacon zone has been contracted and unused beacon slots can be reused for data transmission.

TxOP Ownerships

Using the exemplary beacon period access protocol, any Mesh Point can send information elements (IE) to its neighboring Mesh Point devices. The IEs can be used to negotiate the ownership of the upcoming TxOPs 120 in the current and the next MTP 72. The previous negotiation of the TxOP is important because it makes the usage of the wireless medium predictable, giving Mesh Points the exact knowledge about which neighbor is transmitting and which is receiving at which point in time.

This knowledge enables several advantages in comparison to a random access protocol. One of the advantages is the low probability of collisions: When the negotiation is finished, the owner of the TxOP can be sure that the channel will not be used by any Mesh Point that could interfere with the transmission.

Another important aspect of the improved knowledge is the easy ability to plan simultaneous transmission between pairs of Mesh Points that would not be feasible under other circumstances.

TxOP Negotiation

The occupation of a TxOPs is negotiated between the sender (which becomes the owner of the TxOPs if the negotiation is successful) and the receiver. To accelerate the process, it is possible to negotiate several TxOPs in the same time period. Furthermore, a TxOP can have up to mMaxNoOfReceivers receiving Mesh Points. This allows a transmitter to maximize the usage of a slot. A TxOP ownership may therefore be multi-TxOP and multi-receiver, but it can have only one owner.

The negotiation of new occupations is done by including special TxOP ownership information elements (OIE) in the beacons of the participants. Additionally, an Availability IE might be included before or during the negotiation to improve the speed of finding TxOPs that are free for all participants. The structure of an exemplary TXOP Ownership IE is depicted in FIG. 12; the meaning of the different fields depends on the step of the negotiation.

All active Mesh Points that listen to beacons have to process the OIEs 172 to build up an internal traffic phase occupancy map. In this map, a Mesh Point marks slots as occupied or free, and if it is occupied it additionally stores:

The owner of the slot, which is the Mesh Point that wants to transmit in the slot.

The receivers of this slot which expect to receive data from the owner during the slot.

A slot is marked as occupied if:

A OIE is received in which it is marked as "occupied", and/or

Noise is sensed in this slot during the previous MTPs that is above mNoiseThreshold.

Looking at the embodiment another way, the negotiation can roughly be seen as a two way handshake between the transmitter and the receiver(s). In the first step of the handshake, the transmitter proposes some TxOPs, in which it intends to send data. This is followed by the receiver's reply, which either finishes the negotiation by fixing the announced TxOPs, or by declining the proposal and thus restarting the negotiation.

By indicating the status of the negotiation in the status bit 170 of the OIE 172, all neighboring Mesh Points know if the negotiation has finished and they have to respect the ownership, or if it is only proposed and therefore not obligatory. In the latter case the TxOPs can be reserved, by themselves, the ownership of TxOPs. This is done in a first come, first served technique. This also means that if one TxOP has been reserved by two Mesh Points in the same BP, the earlier beacon wins the TxOP.

Because of the two way handshake, the ownership negotiation has also a similar function as the 802.11 RTS/CTS procedure, as it signals an occupation of the channel. However, it is more efficient because of the possibility of occupying several TxOPs in one handshake.

In detail, if a Mesh Point wants to own slots 84 in the MTP 72, the Mesh Point starts the negotiation process by choosing a suitable pattern of free slots (as marked in the internal map), probably including previous heard Availability IEs of the receiver(s) in the computation. The Mesh Point includes a OIE in its next beacon indicating the chosen TxOPs, the DEVID(s) of the intended receiver(s), its role in this reservation ("transmitter"), and the status of the ownership ("announced") 170. The ReservationID 172 shall be set to a randomly chosen value that is currently not used by this transmitter, which implies that the "double" (ReservationID, transmitter's DEVID) uniquely defines a reservation.

Any Mesh Point can scan all the beacons of the BP for the occurrence of its DEVID in an OIE where the role is set to "transmitter". If such an OIE is received the device checks if the ReservationID is already in use, a new ReservationID indicates a new negotiation. The intended receiver evaluates whether it can acknowledge the announced ownership, which is the case in the following situations:

The medium is free during the announced TxOPs according to the locally stored information, or The new reservation has a higher priority than the reservation(s) occupying the intended slots, or A parallel transmission is possible with high probability.

A higher priority reservation is allowed to take over some, but not all slots of an existent lower priority reservation.

A receiver acknowledges an OIE by including an OIE in its own beacon with the following parameters:

The indicated TxOPs and the ReservationID are the same as in the transmitter's OIE The Partner-ID is the transmitter's DEVID The role is set to "receiver"

The status of the ownership is set to "occupied"

In the case of multiple receiver transmission, which is indicated by several receivers in the transmitter's OEI, the receiver should include an Availability IE in the OIE to shorten the negotiation process in case the other receivers cannot accept the proposed slots. The Availability IE shall be included until a RIE sent by the transmitter with the status "reserved" is received.

In the case that a receiver is not able to acknowledge the proposed reservation, the ownership status of the replying OIE is set to "announced". Furthermore, the OIE indicates all of the slots that may be used for the intended transmission in the bitmap included in the OIE. This will better enable the transmitter to find a successful reservation.

A transmitter must keep sending its "announced" occupation until it receives an answer from all intended receivers or for mTryReservations beacon periods, whichever occurs first. In another embodiment, the transmitter must cancel the reservation.

After the transmitter has collected acknowledging OIEs from all intended receivers, the negotiation has finished successfully and the transmitter becomes the owner of the TxOPs. All the other Mesh Points in the network neighborhood that overheard the OIEs have to respect this ownership. The intended receiver(s) have to listen during the reserved slots for data transmissions.

If an intended receiver of the RIE in the initiating beacon finds out that the proposed slots are occupied and no other slots can be reserved, or if the device is not willing to accept the reservation for any other reasons, then the intended receiver of the RIE shall send a RIE in its next beacon with:

The DEVID set to the transceiver's DEVID

The ReservationID set to the ReservationID of the initial OIE

The role set to "receiver"

The status of the ownership set to "announced"

The reservation information set to zero

Such a RIE shall be interpreted as a declining of a reservation and the initiator shall not re-initiate the reservation negotiation with this receiver.

Maintaining the Ownerships

After a successful negotiation, the participating Mesh Points keep including an OIE in their beacon that indicates the occupied TxOPs and has the status set to "occupied". All other devices that receive these beacons honor this negotiated ownership.

In a situation wherein the owner of or one of the receivers wants to change the occupation, they can restart the negotiation process by sending an OIE with the new information and the old ReservationID, but with the status set to "announced". If a receiver initialized the restart of the negotiation, it should include an Availability IE in its beacon.

If a transmitter or a receiver wants to cancel an existing reservation, they send a cancellation OIE, which consists of the same ReservationID, the partner's DEVID, and the status "occupied", but the reservation information is filled with zeros. All neighboring Mesh Points may delete this reservation from their internal occupancy map after receiving this special OIE.

Acknowledgements

The ACK frame is used by a receiver to report the successful or failed reception of a MSDU or a segment of a MSDU respectively, which was send previously by a transmitter. Because of the ownerships of TxOPs, the receiver is not allowed to send an ACK frame immediately after the reception of the data frame. In a multi reception TxOP sending an ACK frame immediately would be impossible anyway. Furthermore, immediate acknowledgments would imply a change of the transceiver/receiver roles, which is unpredictable for neighboring Mesh Points.

Therefore in embodiments of the present invention, acknowledgements are handled in the same way as any data frames are handled: A TxOP, negotiated between the receiver and the transmitter, has be occupied; the ACK frame can be send together with other frames using a packet train. The ACK frame is preferably sent with frames targeted to the transmitter.

Consequently, a receiver might receive several data frames before it is able to acknowledge the first frame, especially if a suitable TxOP ownership by the receiver does not exist and has to be created first. Once a TxOP is owned, it can be used to send two different type of acknowledging frames:

A Cumulative ACK

Sending a cumulative ACK, the receiver acknowledges all MSDUs (or fragments of MSDUs) that have been send to him up to, but not including the sequence/fragment number indicated in the cumulative ACK. The transmitter may delete all MSDUs up to the indicated one from its sending queue.

A Bitmap ACK

The bitmap ACK is an explicit enumeration of the success or failure status of the last received packets. The sequence control field specifies the next sequence/fragment number of the next packet which is expected at the receiver; excluding packets that have already been send but were received with faults.

The attached bitmap indicates the status of the MSDUs that have been received, it starts with the last successful MSDU (as indicated by the sequence control field—1), for each sequence number two octets in the bitmap represent the status of up to 16 fragments of the corresponding MSDU. The last two octets in the bitmap stand for the MSDU with the lowest sequence number (in a modulo sense) that was not received correctly.

The transmitter may delete all MSDU fragments that are indicated as successful in the bitmap from its sending queue, as well as the MSDUs that have a lower sequence number than the corresponding number of the last two octets in the bitmap.

The combination of both ACK types inside one frame directed to the transmitter is of course possible, but the bitmap ACK must anticipate the cumulative ACK; the content of the first one has precedence over the latter one.

In both ACK frame types the buffer size field indicates the amount of free space in the receiving buffer reserved for this particular transmitter, counted in bytes. This size indicator is used as a flow control mechanism to prevent the transmitter from overstraining the receiver. The transmitter may send only the given amount of bytes before it has to wait for the next ACK. Retransmission of the last frame by the transmitter or the receiver can be used to update this indicator.

Additionally, congestion control like schemes can be used by the transmitter to estimate the optimal number of packets the transmitter can send before waiting for the next ACK.

Embodiments of this invention may include a method of medium access control (MAC) in a communications network including a plurality of master modules (mesh APs) and a plurality of slave modules (STAs), including dividing the time interval (superframe) in two phases: A first phase, for intra-BSS traffic (AP traffic) for allowing the use of existing medium access mechanisms; and a second phase, for intra-DS traffic (mesh traffic). The second phase includes a beacon period taking place every superframe, including information about the structure of the beacon period as seen from the sending mesh point, including the neighbor's and the neighbor's neighbor's beacons and planned transmissions and receptions to and from this mesh point in the current mesh traffic phase. The second phase further includes a beacon period taking place every second superframe only to enhance the efficiency, including the same information as in the beacon period taking place every superframe, additionally including information about planned transmissions and receptions to and from this mesh point the succeeding mesh traffic phase. The second phase also includes a traffic phase for a transmission of the negotiated TxOPs, including also simultaneous transmissions if possible. In addition, embodiments of the invention include using the announcement of the Contention Free Period (CFP) in the Beacon period to silence the legacy stations.

Furthermore, embodiments of the invention may include dividing the Beacon period (BP) in slots, where devices may use multiple slots to dynamically enlarge their beacons, defining dynamically the slot length of slots in the beacon period, and defining a BP duration as a multiple of a TxOP duration and be calculated as the maximum of the last heard traffic in the last BP, the last occupied slot as reported from the received beacons in this BP, the last occupied slot as reported from the received beacons in the last BP plus the appropriate number of free slots, which can be calculated by recognizing the number of zones (by the extension slots of each zone) in the last BP. The BP Length shall never grow larger than mMaxBPLength. In addition, embodiments of the invention allow the use of beacon frames of variable sizes to occupy several subsequent time slots and ordering the beacons in groups having the same size. Furthermore, embodiments of the invention may include allowing the mesh points to send more than one beacon with different information and filling unused beacon slots by sliding (if the beacon is situated directly after the gap) or by jumping (using a last-come first-serve strategy).

The invention also includes the last beacon holder shifting the beacon to the free slots by the following procedure. If "j" is the number of the free beacon slot, it shall transmit a beacon in the original slot with slot "j" set to "01" in the BP Bitmap, transmit a beacon in slot "j" in the next BP, and transmit a departure beacon as described in "BP Leaving" in the original slot. Furthermore, the invention includes defining a beacon frame structure compliant to the IEEE 802.11 standard and that includes a Beacon Period Occupancy Information element consisting of BP length field, BP Bitmap with information of the beacon slots occupied by the neighbor and neighbor's neighbor Mesh points, and Owner vector.

Embodiments of the invention further include an active Mesh point listening to beacons to process an internal traffic phase occupancy map and marking a slot in the BP as occupied if an OIE is received that is marked as "occupied" and/or noise is sensed in this slot during the previous MTPs which is above mNoiseThreshold. And, if it is occupied, additionally storing the owner of the slot, which is the Mesh Point that wants to transmit in the slot and the receivers of this slot which expect to receive data from the owner during the slot.

Additionally, embodiments of invention may also includes sending and receiving ownership information about planned TxOPs, during a mesh traffic phase, consisting of an ownership ID, uniquely identifying the ownership together with the owner's DEVID, the role of the sender of the information during the planned TxOP, being either transmitter or receiver, the status of the ownership, being either announced or occupied, the number of partners, which are either receiver(s) or transmitter, depending of the role of the sender, during the TxOP, and the starting times of the owned TxOPs, indicated by a bitmap.

Furthermore, embodiments of the invention may include a mesh point receiving an ownership information and being the intended receiver of a TxOP under negotiation and acknowledging this TxOP in the following situations—when the medium is free during the announced TxOPs according to the locally stored information, when the new reservation has a higher priority than the reservation(s) occupying the intended slots, or when a parallel transmission as explained in detailed description is possible with high probability. In addition, embodiments of the invention may include a Mesh Point receiving ownership information and being the intended receiver of a TxOP under negotiation, but not being able to acknowledge this ownership thus replying with an "announced" ownership information that reuses the TxOP bitmap as an availability bitmap.

Additional embodiments of the invention may also include a Mesh Point, which is not the intended receiver or transmitter of a TxOP, respecting the announced ownership of the TxOP if the status is set to "occupied." Also, embodiments of the invention define the duration of the mesh traffic phase based on the maximum of the proposed values in the beacon period. Furthermore, the invention includes announcing the beginning of a superframe (TBTT) a small moment before the real start of the superframe and identifying the Mesh APs using a DevID that was selected randomly after collecting all Ids detected during the beacon period. In addition, embodiments of the invention include transmitting mesh traffic and AP-traffic at different frequencies wherein a receiver acknowledges all MSDUs (or fragments of MSDUs) that have been sent to the receiver, except for the sequence/fragment number indicated in the cumulative ACK. The transmitter may delete all MSDUs up to the indicated one from its sending queue. The embodiments of the invention may also include a receiver that can signal the successful reception of a data packet with ACK information piggybacked into its own data transmission back to the transmitter.

Many variations and embodiments of the above-described invention and method are possible. Although only certain embodiments of the invention and method have been illustrated in the accompanying drawings and described in the foregoing Detailed Description, it will be understood that the invention is not limited to the embodiments disclosed, but is capable of additional rearrangements, modifications and substitutions without departing from the invention as set forth and defined by the following claims. Accordingly, it should be understood that the scope of the present invention encompasses all such arrangements and is solely limited by the claims as follows.

What is claimed is:

1. A method of medium access control in a network, comprising a plurality of mesh nodes, the method, operable in a sending mesh node within the network, the method comprising:
   dividing a time interval into a first phase and a second phase, the second phase including a beacon period and the beacon period being divided into one or more slots, where the sending mesh node may use the slots to dynamically enlarge its corresponding beacon period, said enlarged beacon period including information about each slot and its occupancy by a corresponding one of a previous neighboring mesh node and a slot length for each of the slots in the beacon period is dynamically defined,
   transmitting the beacon period, every time interval, with information seen from the sending mesh node; and
   transmitting the beacon period, every second time interval, with information seen from the mesh node and further information regarding planned transmissions from the sending mesh node.

2. The method of claim 1, wherein the first phase is used for Access Point-traffic (AP-traffic).

3. The method of claim 1, further comprising announcing a Contention Free Period (CFP) in the beacon period, the CFP announcement instructs predetermined stations in the network to be silent during the CFP period.

4. The method of claim 1, wherein a beacon period duration is a multiple of a transmission opportunities (TxOP) duration.

5. The method of claim 4, wherein the beacon period duration is calculated to be the maximum of a last received beacon duration period, the amount of time as reported from other beacons received in the present beacon period, and the amount of time as reported from beacons in the last received beacon period plus a number of free slots such that the beacon period duration is said multiple of a TxOP.

6. The method of claim 5, wherein said beacon duration is not greater than a max length of the beacon period (mMaxBPLength).

7. The method of claim 1, further including ordering slot lengths for each of the slots in the beacon period by duration size.

8. The method of claim 1, further comprising allowing a Mesh Point to send a first and a second beacon in one beacon period provided that information in said first beacon is different that information in said second beacon.

9. The method according to claim 1, further comprising filling unused slots in said beacon period by sliding or by jumping.

10. The method according to claim 1, comprising defining a beacon frame structure as being compliant with an IEEE Wireless LAN standard.

11. The method according to claim 10, further comprising including a Beacon Period Occupancy (BPO) Information Element (IE).

12. The method according to claim 11, wherein said BPOIE comprises a beacon period length field, a beacon period bitmap and an owner vector.

13. A wireless network comprising: a plurality of master modules and a plurality of slave modules, said master modules and said slave modules communicating using a medium access point protocol (MAC) for a wireless distribution system; said MAC comprising:
   dividing a time interval into a first phase for intra-basic service set (BSS) traffic and a second phase for intra distributed system (DS) traffic, said second phase comprising a beacon period; the beacon period being divided into one or more slots that dynamically define a slot length for each of a plurality of slots in the beacon period, a duration of said plurality of slots being at least a portion of a beacon period duration, wherein said beacon period includes information about each slot and its occupancy by a corresponding one of a previous neighboring module and wherein a sending module transmits:
      a beacon period, every time interval, with information seen from the sending module; and
      the beacon period, every second time interval, with information seen from the sending module and further information regarding planned transmissions from the sending module.

14. The network of claim 13, wherein a master module is an Access Point in said wireless network.

15. The network of claim 13, wherein said MAC protocol supports parallel transmission by the means of TxOP reservation.

16. The network of claim 13, wherein said intra-DS traffic is Mesh Traffic.

17. The network of claim 16, wherein said beacon period has a beacon period duration that is a multiple of a TxOP duration.

18. The network of claim 16, wherein said plurality of slots are organized in said beacon period by size.

19. The method of claim 1, wherein said beacon period is extended based on a number of previous neighboring stations.

20. The network of claim 13, wherein said beacon period is extended based on a number of previous neighboring modules.

* * * * *